United States Patent [19]

Tachibana

[11] Patent Number: 5,590,005
[45] Date of Patent: Dec. 31, 1996

[54] THIN FILM MAGNETIC HEAD

[75] Inventor: Hiroaki Tachibana, Tokyo, Japan

[73] Assignee: NEC Corporation, Tokyo, Japan

[21] Appl. No.: 498,001

[22] Filed: Jun. 7, 1995

Related U.S. Application Data

[63] Continuation of Ser. No. 162,894, Dec. 8, 1993, abandoned.

[30] Foreign Application Priority Data

Dec. 10, 1992 [JP] Japan ................ 4-352647

[51] Int. Cl.$^6$ .............................. G11B 5/31; G11B 5/60
[52] U.S. Cl. ............................................... 360/103
[58] Field of Search ............................. 360/103, 104, 360/102; 29/603

[56] References Cited

U.S. PATENT DOCUMENTS

| | | | |
|---|---|---|---|
| 4,856,181 | 8/1989 | Pichler et al. | 360/103 |
| 4,924,334 | 5/1990 | Diepers et al. | 360/103 |
| 5,001,591 | 3/1991 | Nakashima | 360/103 |
| 5,187,623 | 2/1993 | Ibaraki | 360/103 |

FOREIGN PATENT DOCUMENTS

| | | | |
|---|---|---|---|
| 60-107715 | 6/1985 | Japan | 360/103 |
| 61-9812 | 1/1986 | Japan | 360/103 |
| 62-73410 | 4/1987 | Japan . | |
| 4349209 | 12/1992 | Japan | 360/103 |
| 5-46940 | 2/1993 | Japan | 360/103 |

OTHER PUBLICATIONS

IBM Technical Disclosure Bulletin, "Method for Wiring a Magnetic Head", vol. 23, No. 8, Church et al, Jan. 1981, p. 3873.

Primary Examiner—Robert S. Tupper
Assistant Examiner—David L. Ometo
Attorney, Agent, or Firm—Sughrue, Mion, Zinn, Macpeak & Seas

[57] ABSTRACT

A thin film magnetic head capable of recording and reproducing data accurately by providing a sufficient gap between adjoining terminals while providing each terminal with a required area. Magnetic elements are each connected to a respective terminal by leads. The terminals connected to the same magnetic element are deviated from each other in the widthwise direction of a slider. Gold terminals are respectively provided on the terminals and arranged at spaced locations along the width of the slider. The terminals connected to the same magnetic element have their corner portions facing each other removed to form parallel slants.

5 Claims, 2 Drawing Sheets

THIN FILM MAGNETIC HEAD

This is a Continuation of application Ser. No. 08/162,894 filed Dec. 8, 1993 now abandoned.

BACKGROUND OF THE INVENTION

The present invention relates to a thin film magnetic head and, more particularly, to a thin film magnetic head capable of recording and reproducing data accurately by providing a sufficient gap between terminals while providing each terminal with a required area.

A conventional thin film magnetic head has a slider provided with a pair of rail portions at opposite sides thereof in the widthwise direction. Magnetic elements are located on the end of the slider which faces the rail portions. Gaps each form part of the respective magnetic element and is open to the outside on the surface of the associated rail portion. Two leads extend out from each magnetic element and terminate at a respective terminal. All the terminals have an identical elongate configuration extending in the widthwise direction of the slider and are arranged side by side along the thickness of the slider.

Metal wires are connected to the terminals by wire bonding. A gold terminal is provided on each terminal to enhance the contact resistance and bonding strength to the wires as well as erosion resistance. Such gold terminals are several microns thick and broader in area than the terminals. Specifically, it has been customary to provide the terminals on the slider, overcoat the slider with alumina ($Al_2O_3$) by sputtering, lap the surface of the slider to cause the terminals to appear, and then plate the terminals with gold.

A current trend in the magnetic recording and reproduction art is toward the down-sizing of a thin film magnetic head and, therefore, the associated terminals require small areas. However, each terminal should be provided with some area matching the limited positioning accuracy available with a wire bonding device. In such a dilemmatic situation, it is necessary to reduce the distance between the adjoining terminals which are connected to the same magnetic element. If the distance between the terminals is short, it is likely that $Al_2O_3$ fails to fill up the gap between the terminals in the event of overcoating and leaves it void. Moreover, should impurities be introduced in the void during the course of matching of the slider, they would bring about erosion and dust problems to thereby obstruct reliable data recording and reproduction. Although an implementation for eliminating these problems is taught in, for example, Japanese Patent Laid-Open Publication (Kokai) No. 62-73410, it has some problems left unsolved.

SUMMARY OF THE INVENTION

It is, therefore, an object of the present invention to provide a thin film magnetic head capable of recording and reproducing data accurately by providing a relatively great gap between adjoining terminals while providing each terminal with a required area.

A thin film magnetic head of the present invention comprises a pair of magnetic elements provided on a slider at spaced locations along the width of the slider, and two pairs of terminals each being connected to respective one of the magnetic elements. The terminals in each of the pairs are spaced a predetermined distance from each other in the direction of thickness of the slider and deviated from each other in the widthwise direction of the slider.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 3:
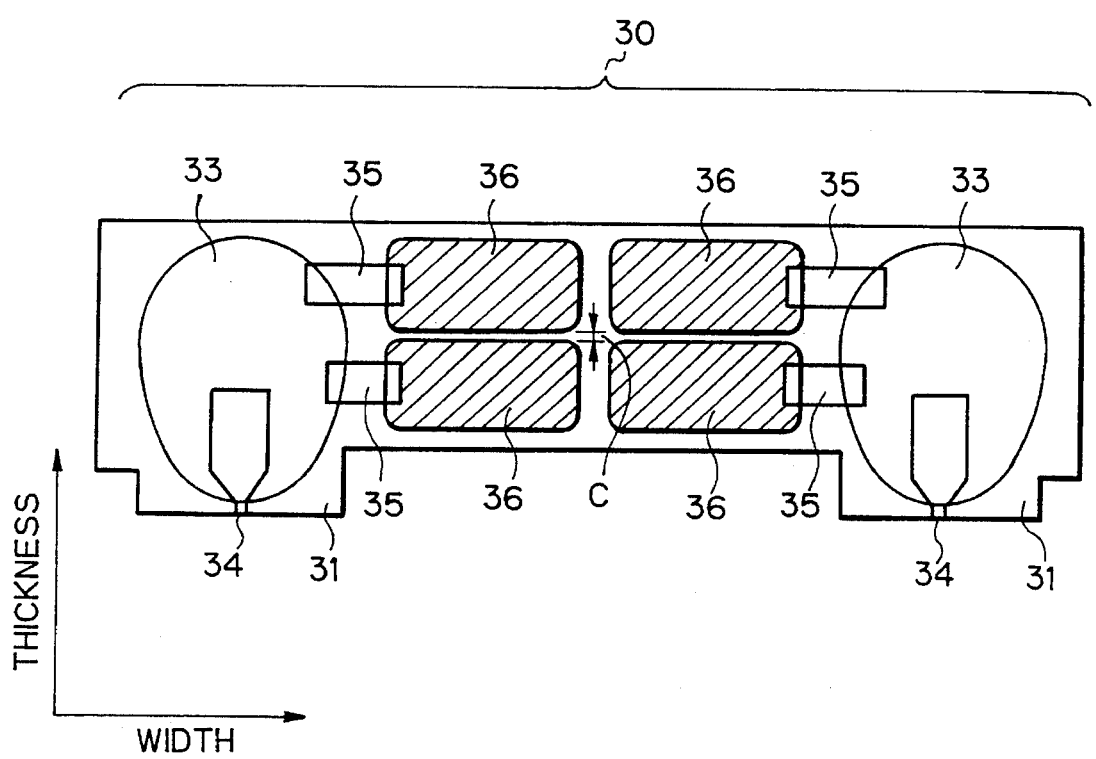
FIG. 3 is a front view of a conventional thin film magnetic head.

To better understand the present invention, a brief reference will be made to a conventional thin film magnetic head, shown in FIG. 3. The figure is a view of the head as seen from the trailing edge side thereof. As shown, the head has a slider 30 provided with a pair of rail portions 31 at opposite sides thereof in the widthwise direction. Magnetic elements 33 are located on the end of the slider 30 which faces the rail portions 31. Gaps 34 each forms part of the respective magnetic element 33 and is open to the outside on the surface of the associated rail portion 31. Two leads 35 extend out from each magnetic element 31 and terminate at respective terminal 36. All the terminals 36 have an identical elongate configuration extending in the widthwise direction of the slider 30 and are arranged side by side along the thickness of the slider 30.

Metal wires are connected to the terminals 36 by wire bonding, as stated earlier. A gold terminal is provided on each terminal 36 to enhance the contact resistance and bonding strength to the wires as well as erosion resistance. Such gold terminals are several microns thick and broader in area than the terminals 36. Specifically, it has been customary to provide the terminals 36 on the slider 30, overcoat the slider 30 with $Al_2O_3$ by sputtering, lap the surface of the slider 30 to cause the terminals 36 to appear, and then plate the terminals 36 with gold.

Today, there is an increasing demand for terminals 36 whose area is small enough to implement a miniature thin film magnetic head. On the other hand, each terminal 36 should be provided with some area matching the limited positioning accuracy available with a wire bonding device. In such a dilemmatic situation, it is necessary to reduce the distance C between the adjoining terminals 36 which are connected to the same magnetic element 33. If the distance C between the terminals 36 is short, it is likely that Al2O3 fails to fill up the gap between the terminals 36 in the event of overcoating and leaves it void. Moreover, should impurities be introduced in the void during the course of matching of the slider 30, they would bring about erosion and dust problems to thereby obstruct reliable data recording and reproduction.

Figure 1:
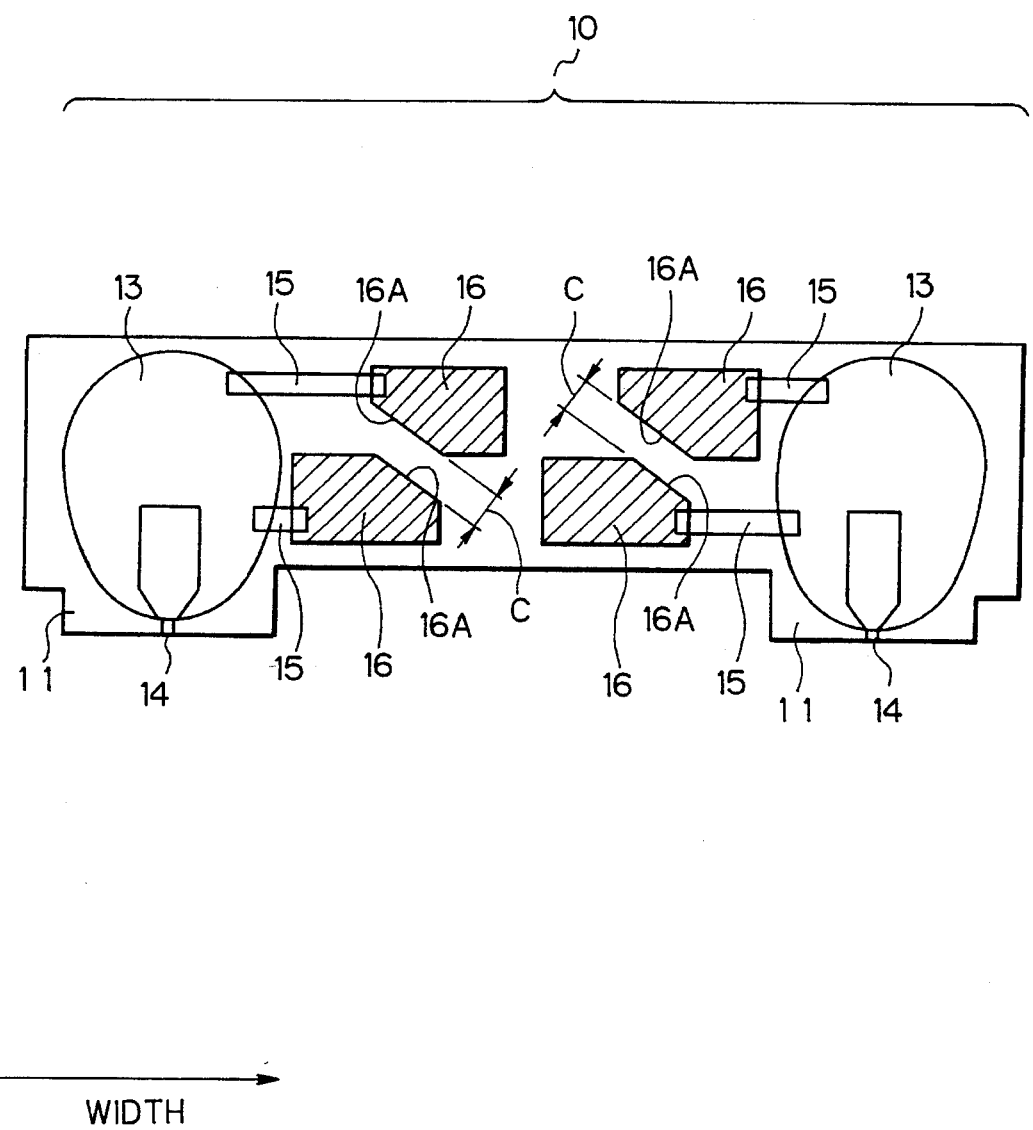
FIG. 1 is a front view of a thin film magnetic head embodying the present invention.

Referring to FIG. 1, a thin film magnetic head embodying the present invention is shown in a view similar to the conventional head in orientation. As shown, the head has a slider 10 provided with a pair of rail portions 11 at opposite sides in the widthwise direction. Magnetic elements 13 are located on the end of the slider 10 which faces the rail portions 11. Gaps 14 each forms part of the respective magnetic element 13 and is open to the outside on the surface of the associated rail portion 11. Two leads 15 extend out from each magnetic element 13 and terminate at respective terminal 16. The leads 15 extending out from the same magnetic element 13 are spaced a predetermined distance from each other and deviated from each other in the widthwise direction of the slider 10. Specifically, imaginary lines extending through the centers of the upper and lower terminals 16, as viewed in the figure, are deviated a predetermined distance from each other in the widthwise direction of the slider 10. While the lower terminal 16 is shown as being located inwardly relative to the upper terminal 16, their relative position may, of course, be inverted in practice. The terminals 16 connected to the same magnetic element 13 are flat and have their corner portions facing each other removed to form parallel slants 16A. The slants 16A provide a relatively great gap C between the adjoining terminals 16. It is to be noted that the both the leads 15 and the terminals 16 may be made of copper (Cu) by way of example.

As stated above, the illustrative embodiment provides a greater gap C, which is at least about 100 microns, between the adjoining terminals 16 than the conventional head. This allows $Al_2O_3$ to fill up the gap between the terminals 16 and, therefore, promotes accurate data recording and reproduction of the head.

Figure 2:
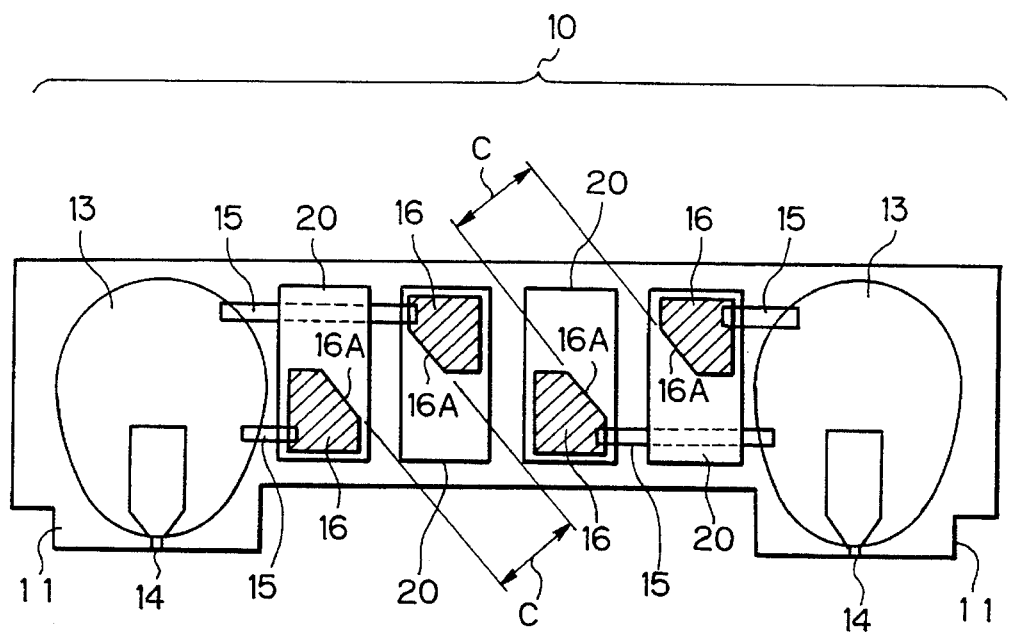
FIG. 2 is a front view showing an alternative embodiment of the present invention.

FIG. 2 shows an alternative embodiment of the present invention. In the figure, the same constituents as the constituents of the previous embodiment are designated by the same reference numerals, and a detailed description thereof will not be made in order to avoid redundancy. As shown, a gold terminal 20 is provided on each terminal 16 and is broader in area than the terminal 16. Each gold terminal 20 has a rectangular configuration extending in the direction of thickness of the slider 10. Four gold terminals 20 each having such a configuration are arranged at spaced locations along the width of the slider 10.

This embodiment is also successful in providing a great gap C, which is at least about 100 microns, between the adjoining terminals 16. The gold terminals 20 are broad enough to implement a necessary margin for wire bonding.

In summary, it will be seen that the present invention provides a thin film magnetic head having terminals provided with a substantial area and spaced a relatively great distance from each other. The head, therefore, insures accurate recording and playback by eliminating the introduction of impurities and other undesirable occurrences, while meeting the down-sizing requirement.

Various modifications will become possible for those skilled in the art after receiving the teachings of the present disclosure without departing from the scope thereof.

What is claimed is:

1. A thin film magnetic head having terminals formed on a slider, comprising:

a pair of magnetic elements provided on said slider at spaced locations along a direction of width of said slider; and a pair of first and second terminals connected to one of said magnetic elements by first and second leads, respectively, and a pair of third and fourth terminals connected to the other of said magnetic elements by third and fourth leads, respectively, said first and second terminals being spaced a predetermined distance from each other in a direction of thickness of said slider, which is normal to said direction of width of said slider, and deviated from each other in said direction of width of said slider so that a first end of said first terminal which is closest to said one of said magnetic elements is closer to said one of said magnetic elements in said direction of width of said slider than any end of said second terminal, and a second end of said first terminal opposite to said first end of said first terminal is further from said one of said magnetic elements in said direction of width of said slider than a first end of said second terminal, said first end of said second terminal is closest to said one of said magnetic elements, and is closer to said one of said magnetic elements in said direction of width of said slider than a second end of said second terminal opposite to said first end of said second terminal, and said third and fourth terminals being spaced a second predetermined distance from each other in said direction of thickness of said slider and deviated from each other in said direction of width of said slider so that a first end of said third terminal which is closest to said other of said magnetic elements is closer to said other of said magnetic elements in said direction of width of said slider than any end of said fourth terminal, and a second end of said third terminal opposite to said first end of said third terminal is further from said other of said magnetic elements in said direction of width of said slider than a first end of said fourth terminal, said first end of said fourth terminal is closest to said other of said magnetic elements, and is closer to said other of said magnetic elements in said direction of width of said slider than a second end of said fourth terminal opposite to said first end of said fourth terminal, said first terminal having a corner thereof removed to form a first slant and said second terminal having a corner thereof removed to form a second slant, said first and second slants being substantially parallel to each other, and said third terminal having a corner thereof removed to form a third slant and said fourth terminal having a corner thereof removed to form a fourth slant, said third and fourth slants being substantially parallel to each other.

2. A head and slider as claimed in claim 1, further comprising gold terminals each being provided on a respective one of said first through fourth terminals and arranged at predetermined intervals in the direction of width of said slider.

3. A head and slider as claimed in claim 1, wherein said first and second slants are at a distance from each other equal to a distance at which said third and fourth slants are from each other.

4. A head and slider as claimed in claim 3, wherein said distances between said first and second slants and said third and fourth slants are at least about 100 microns.

5. A head and slider as claimed in claim 1, wherein said first through fourth terminals each have an area sufficient to compensate for limitations in positioning accuracy of a wire bonding device which is used to attach wires to the terminals.

* * * * *